(12) United States Patent
Magrath

(10) Patent No.: US 10,321,751 B1
(45) Date of Patent: Jun. 18, 2019

(54) DETACHABLE STRAP HINGE MECHANISM FOR HEAD-MOUNTED DISPLAY

(71) Applicant: Facebook Technologies, LLC, Menlo Park, CA (US)

(72) Inventor: Lesley Ribble Magrath, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 157 days.

(21) Appl. No.: 15/651,954

(22) Filed: Jul. 17, 2017

(51) Int. Cl.
*G06F 3/01* (2006.01)
*A45F 5/00* (2006.01)

(52) U.S. Cl.
CPC ............... *A45F 5/00* (2013.01); *G06F 3/011* (2013.01); *A45F 2005/002* (2013.01)

(58) Field of Classification Search
CPC .......................................................... G06F 3/01
See application file for complete search history.

(56) References Cited

U.S. PATENT DOCUMENTS

| | | | | |
|---|---|---|---|---|
| 5,321,416 | A * | 6/1994 | Bassett | A42B 3/145 345/8 |
| 5,767,820 | A * | 6/1998 | Bassett | G02B 27/017 345/7 |
| 7,633,683 | B2 * | 12/2009 | Beck | G02B 27/0172 359/630 |
| 10,004,289 | B2 * | 6/2018 | Teetzel | A42B 3/04 |
| 2010/0327028 | A1 * | 12/2010 | Nakabayashi | A42B 1/247 224/162 |
| 2011/0127305 | A1 * | 6/2011 | Yates | G02B 7/002 224/181 |
| 2012/0280007 | A1 * | 11/2012 | Nakabayashi | G02B 27/0176 224/181 |
| 2017/0102546 | A1 * | 4/2017 | Tempel | G02B 27/0176 |
| 2017/0103573 | A1 * | 4/2017 | Drinkwater | G02B 27/0179 |
| 2018/0348863 | A1 * | 12/2018 | Aimone | G06F 3/015 |

* cited by examiner

*Primary Examiner* — Chad M Dicke
(74) *Attorney, Agent, or Firm* — Fenwick & West LLP

(57) ABSTRACT

Embodiments relate to a rotatable hinge for a head strap connector of a head-mounted display (HMD) that is detachable. The rotatable hinge has frictional elements that allow resistive rotation of the head strap connector relative to the HMD. The rotatable hinge has an end piece connected to the head strap connector that may be interlocked with the HMD by inserting the end piece into a cavity of the HMD and rotating the end piece in the cavity. The cavity has pins that pass through the end piece and interlock with walls along the outer edge of the end piece. Once interlocked with the HMD, the pins interlocked with the end piece allow the end piece to pivot relative to the HMD allowing the head strap connector to adjust to the size of a user's head.

17 Claims, 7 Drawing Sheets

DETACHABLE STRAP HINGE MECHANISM FOR HEAD-MOUNTED DISPLAY

BACKGROUND

The present disclosure relates to a head-mounted display (HMD), and specifically, to a head strap hinge mechanism.

Head-mounted displays (HMDs) may be used to present augmented and/or virtual information to a user. For example, a virtual reality (VR) headset may be used to simulate virtual environments. HMDs are used in a variety fields, some of these include gaming, engineering, medicine, and aviation. To perform these operations, HMDs may need robust head strap assemblies which can accommodate a wide variety of user head shapes while also keeping the HMD firmly, yet comfortably, secured to the user's head. Furthermore, the head strap assembly may need to disconnect from the HMD to allow for strap adjustments or better access to the HMD.

SUMMARY

Embodiments relate to a rotatable hinge for a head strap connector which is removably interlocked to the body of head-mounted display (HMD). The HMD includes an end piece, a cap, and at least one cap pin. The end piece is rotatably connected to the head strap connector. The cap is formed with a cavity extending in a longitudinal direction to receive the end piece and secured to a frame of the HMD. The cap pin protrudes inward into the cavity of the cap to engage with the end piece for securing the end piece to the cap, the end piece rotatable relative to the cap after moving in the longitudinal direction to disengage from the cap for removal from the cap.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments relate to a rotatable hinge for a head strap connector of a head-mounted display (HMD) that is detachable. The rotatable hinge has frictional elements that allow resistive rotation of the head strap connector relative to the HMD. The rotatable hinge has an end piece connected to the head strap connector that may be interlocked with the HMD by inserting the end piece into a cavity of the HMD and rotating the end piece in the cavity. The cavity has pins that pass through the end piece and interlock with walls along the outer edge of the end piece. Once interlocked with the HMD, the pins interlocked with the end piece allow the end piece to pivot relative to the HMD allowing the head strap connector to adjust to the size of a user's head. The end piece may also be disconnected and removed from the HMD by pressing the hinge and rotating the hinge in an opposite direction.

Figure 1:
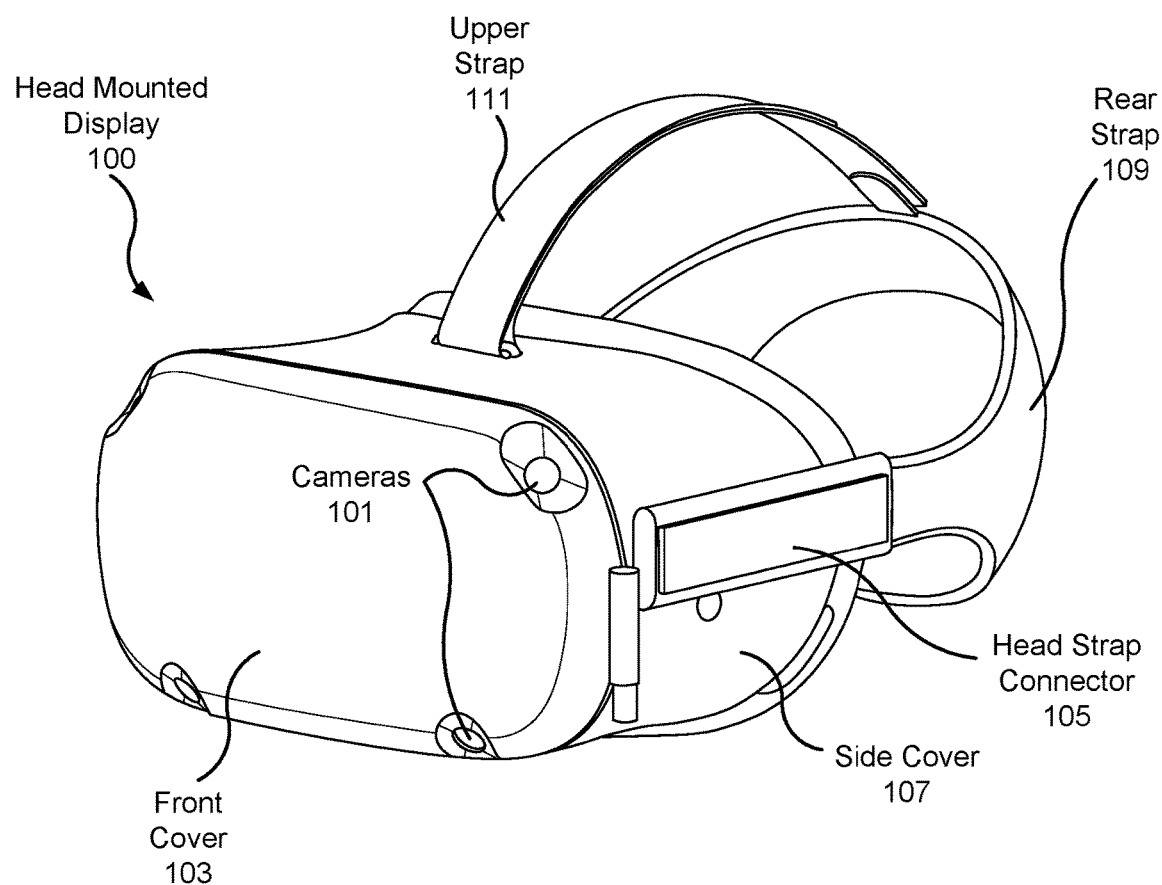
FIG. 1 is a perspective view of a head-mounted display (HMD) according to one embodiment.

FIG. 1 is a perspective view of a HMD 100 according to one embodiment. The HMD 100 may include, among others components, cameras 101, a front cover 103, a head strap connector 105, a side cover 107, and a head strap assembly. The head strap assembly may include a rear strap 109, and an upper strap 111 connected to the rear strap 109. The front cover 103 is attached at the front of the side cover 107. The rear strap 109 is attached to the side cover 107 via the head strap connector 105. The upper strap 111 is attached to the rear strap 109 and secured by inserting the end of the upper strap 111 into a slot formed in the side cover 107. The components and the structure of HMD 100 as illustrated in FIG. 1 are merely illustrative.

The front cover 103 is a rigid member placed at the front part of the HMD 100 to protect components in the HMD 100. In one embodiment, the front cover 103 is secured to the side cover 107 via screws or other fastening mechanisms that enables the front cover 103 to be removed from the side cover 107 for maintenance purposes. The front cover 103 has two cameras 101 at upper two corners and bottom two edges. These cameras 101 may be used to capture views outside of the HMD 100, and display them to the user.

The rear strap 109 and upper strap 111 wrap around a user's head to fasten the HMD 100 to the user's face. The rear strap 109 and the upper strap 111 may be made of elastic, fabric or a combination thereof to be flexible yet comfortable for the user. The rear strap 109 is connected to the side cover 107 of the HMD 100 by the head strap connector 105 which may rotate in relation to the side cover 107. Additionally, the head strap connector 105 may disconnect from the side cover 107, enabling a user to replace the rear strap 109 or a maintenance technician easier access to the side cover 107. The upper strap 111 provides additional support and is connected to the rear strap 109 and the top of the side cover 107.

Figure 2:
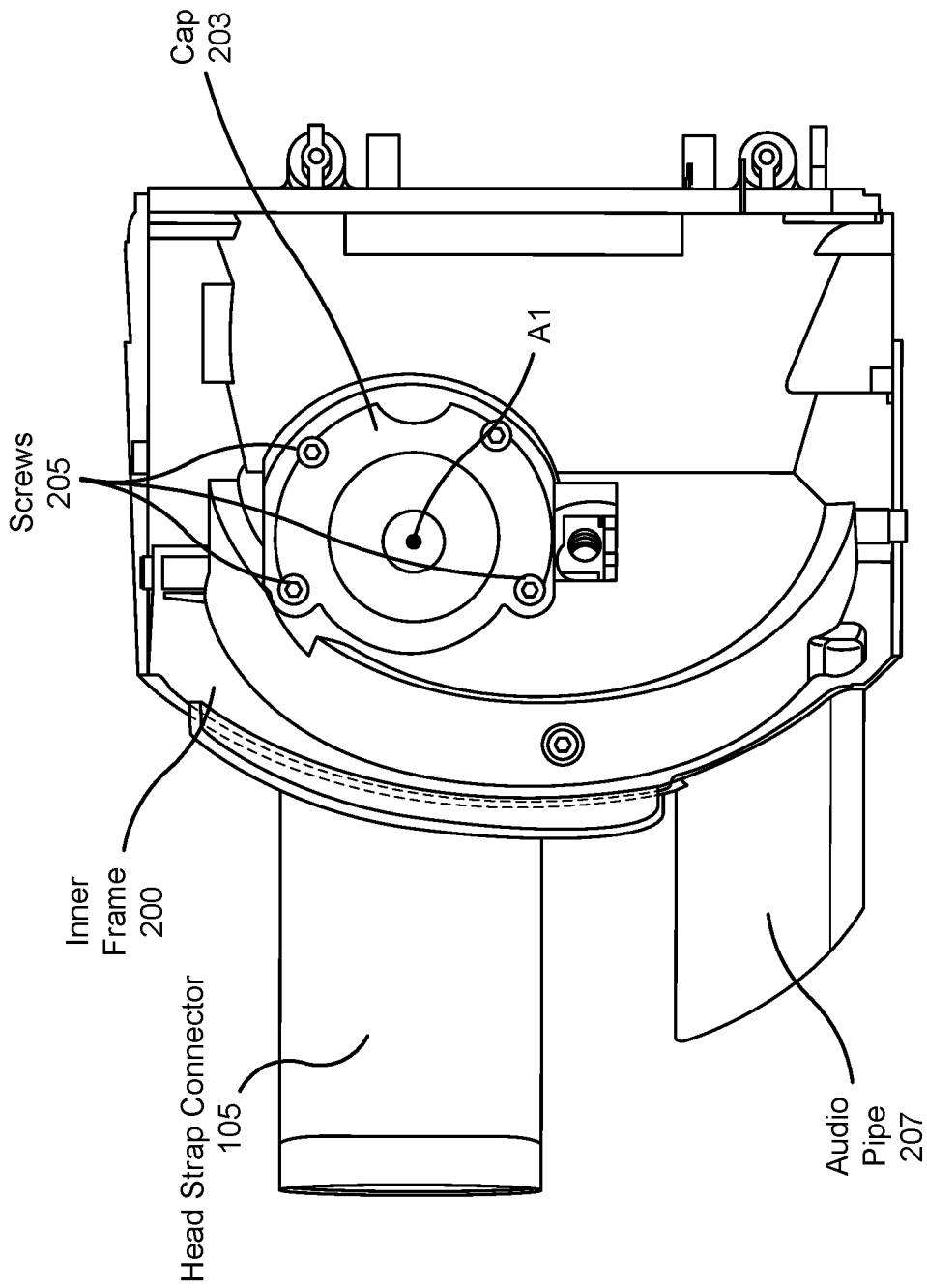
FIG. 2 is a cross-sectional side view of the HMD of FIG. 1 with a front cover and head strap assembly removed, according to one embodiment.
Figure 3:
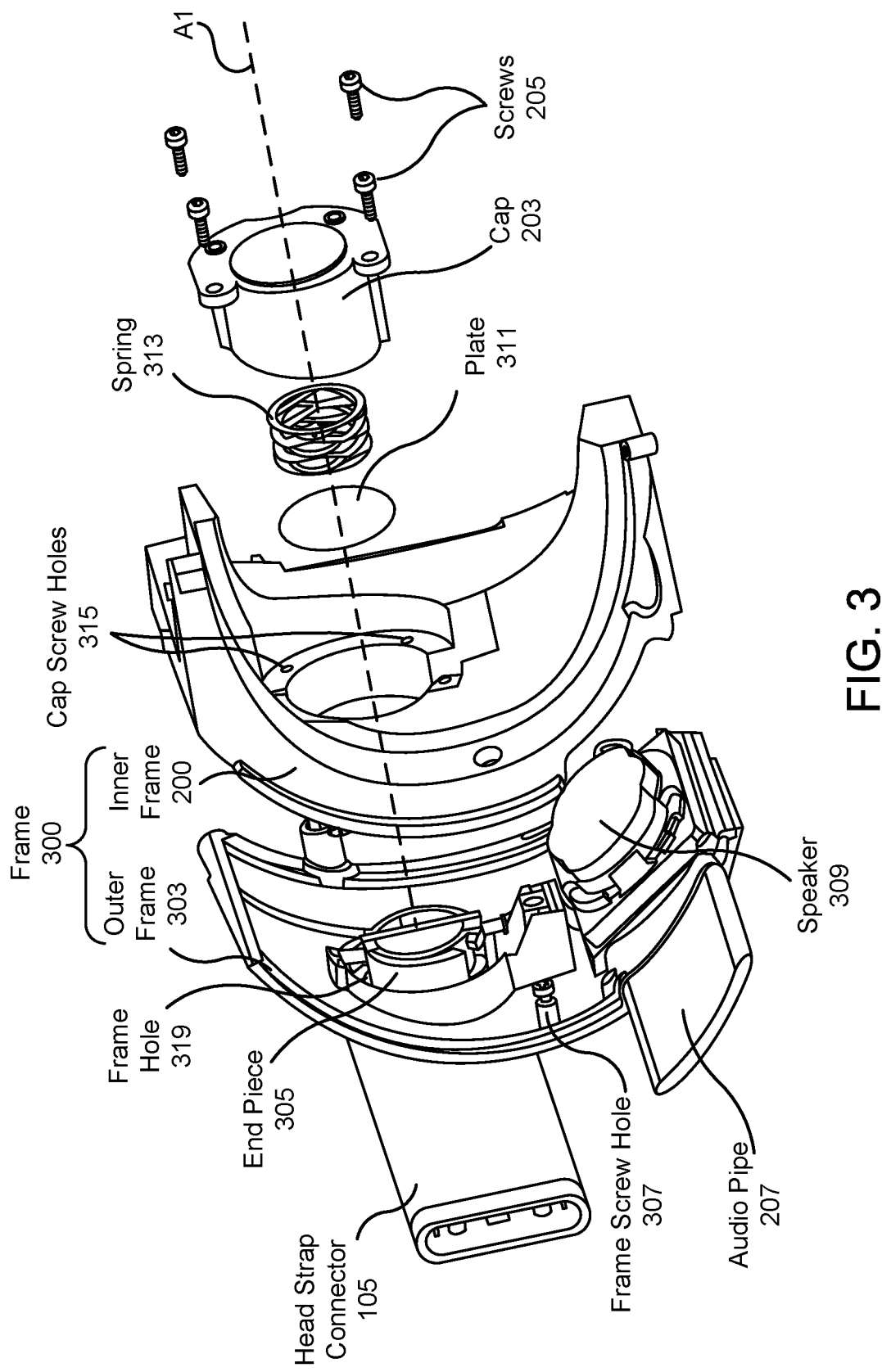
FIG. 3 is an exploded perspective view of the HMD of FIG. 2, according to one embodiment.

FIG. 2 is a cross-sectional side view of the HMD 100 with the front cover and head strap assembly removed, according to one embodiment. Specifically, FIG. 2 is a view taken from an end of longitudinal axis A1 shown in FIG. 3. FIG. 3 is an exploded perspective view of the HMD 100 of FIG. 2. The HMD 100 may include, among other components, a cap 203, screws 205, audio pipe 207, frame 300, end piece 305, speaker 309, plate 311, and spring 313. The frame 300 is formed with frame screw holes 307, frame hole 319, and cap screw holes 315.

The frame 300 includes an outer frame 303 forming an outer shell of the HMD 100 and an inner frame 200 placed inside the outer frame 303. The inner frame 200 and the outer frame 303 are joined together via screws (not shown) which screw into the frame screw hole 307. The frame hole 319 formed through the frame 300 receives the end piece 305 and the cap 203. The cap 203 is mounted to the inner frame 200 via screws 205 that screw into the cap screw holes 315. Also, the cap 203 houses the end piece 305 (inserted through the frame hole 319), plate 311, and spring 313. The end piece 305 is rotatably connected to the head strap connector 105 and removably interlocked to the cap 203. The audio pipe 207 and speaker 309 are mounted to the inside surface of the outer frame 303.

The frame 300 is a rigid member which houses the internal components of the HMD 100. The frame 300 also provides structural support to the HMD 100. When the HMD 100 is subject to impact (e.g. dropping of the HMD 100), the frame 300 functions as a cover that prevents internal components from damage. The frame 300 may be constructed out of metal, plastic, or any other rigid material, or any combination thereof.

Within the frame 300, the outer frame 303 serves as a platform onto which other components of the HMD 100, such as the inner frame 200 speaker 309, and audio pipe 207, are mounted. The outer frame 303 may be the side cover 107 seen in FIG. 1 or it may be a part of the side cover 107.

The inner frame 200 is a protective surface to the components mounted to the outer frame 303. The inner frame 200 is also a surface that receives the cap 203 and screws that fasten the cap 203 to the HMD 100. The inner frame 200 may be mounted to the outer frame 303 via screws which screw into any number of the frame screw holes 307. Alternatively, the inner frame 200 may be mounted to the outer frame 303 via adhesive or mechanical fasteners.

The frame hole 319 formed through the frame 300 receives the cap 203 and the end piece 305 along the axis A1. Although the frame hole 319 is circular in the illustrated embodiment, the frame hole 319 may be any shape which allows the cap 203 to be received.

The end piece 305 may be removably interlocked to the cap 203 and is rotatably connected to the head strap connector 105. The end piece 305 shall be described in further detail below with reference to FIGS. 6 and 7.

The cap 203 houses the plate 311 and spring 313, and receives the end piece 305. The cap 203 is generally cylindrical in shape and is formed with a cavity 610 (shown in FIG. 6) extending along axis A1. The cap 203 is secured via screws 205 that screw into the cap screw holes 315 formed in the inner frame 200. In other embodiments, the cap 203 may be secured to the inner frame 200 with adhesive or mechanical fasteners.

The plate 311 and spring 313 apply a biasing force which pushes the end piece 305 within the cap 203 along the axis A1, away from the HMD 100. Depending on the orientation of the end piece 305, the biasing force keeps the end piece 305 interlocked with the cap 203 or pushes the end piece 305 out of the cap 203 cavity 610 and away from the HMD 100, along the axis A1. The end piece 305 may become disengaged from the cap 203 when force is applied to the end piece 305 that overrides the biasing force and then rotated.

The plate 311 is a rigid member that distributes the force from the spring 313 uniformly across the surface of the end piece 305. The plate 311 is a thin flat plate with two main surfaces on opposite sides from one another. The plate 311 may be circular or any shape which fits within the cavity 610. The plate 311 may be made of plastic or metal. The spring 313 exerts a force along axis A1 against the cap 203 and plate 311. The spring 313 is housed between the walls of the cavity 610 and the plate 311. The spring is generally made of metal but may also be made of plastic.

The speaker 309 produces sounds which may relate to the images displayed to the user of the HMD 100. The speaker 309 is mounted to the inner surface of the outer frame 303 via adhesive or mechanical fastener. The audio pipe 207 directs sound from the speaker 309 to the vicinity of the user's ear at the rear of the HMD 100.

Figure 4:
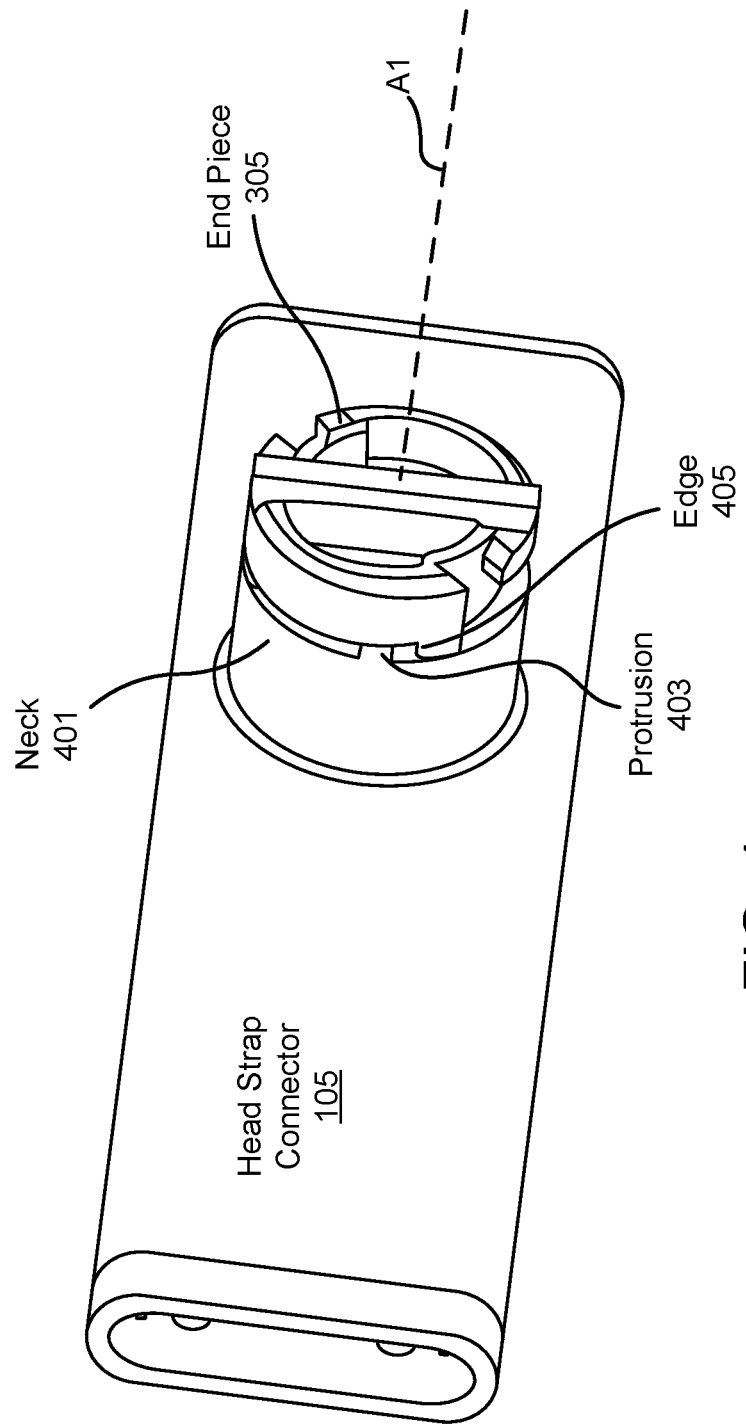
FIG. 4 is a perspective view of a head strap connector and an end piece of the HMD, according to one embodiment.

FIG. 4 is a perspective view of the head strap connector 105 and the end piece 305 of the HMD 100, according to one embodiment. The head strap connector 105 may include, among other components, a neck 401 and protrusion 403. The end piece 305 may include, among other components, an edge 405. The neck 401 is mounted or fused to the side of the head strap connector 105 facing the HMD 100. The protrusion 403 is mounted or fused to the top surface 517 (shown in FIG. 5) of the neck 401 facing the HMD 100. The neck 401 houses internal components of the head strap connector 105 and raises the rotatably connected end piece 305 along axis A1, away from the side of the head strap connector 105. This allows the end piece 305 to be inserted into the frame hole 319 and cavity 610 of the cap 203 of the HMD 100. The neck 401 in FIG. 4 is cylindrical and extend along the axis A1, but the neck 401 may have different shapes in other embodiments.

The protrusion 403 is a raised wall or surface which restricts the rotation of the end piece 305 relative to the head strap connector 105. As the end piece 305 rotates axially with respect to axis A1, an edge 405 of the end piece 305 comes into contact with the protrusion 403 and restricts the end piece 305 from further rotation. Alternatively, the protrusion could be an inset of the neck 401. Although only one protrusion 403 is visible in FIG. 4, the neck 401 could contain any number of protrusions 403 along the top surface 517 of the neck 401.

Figure 5:
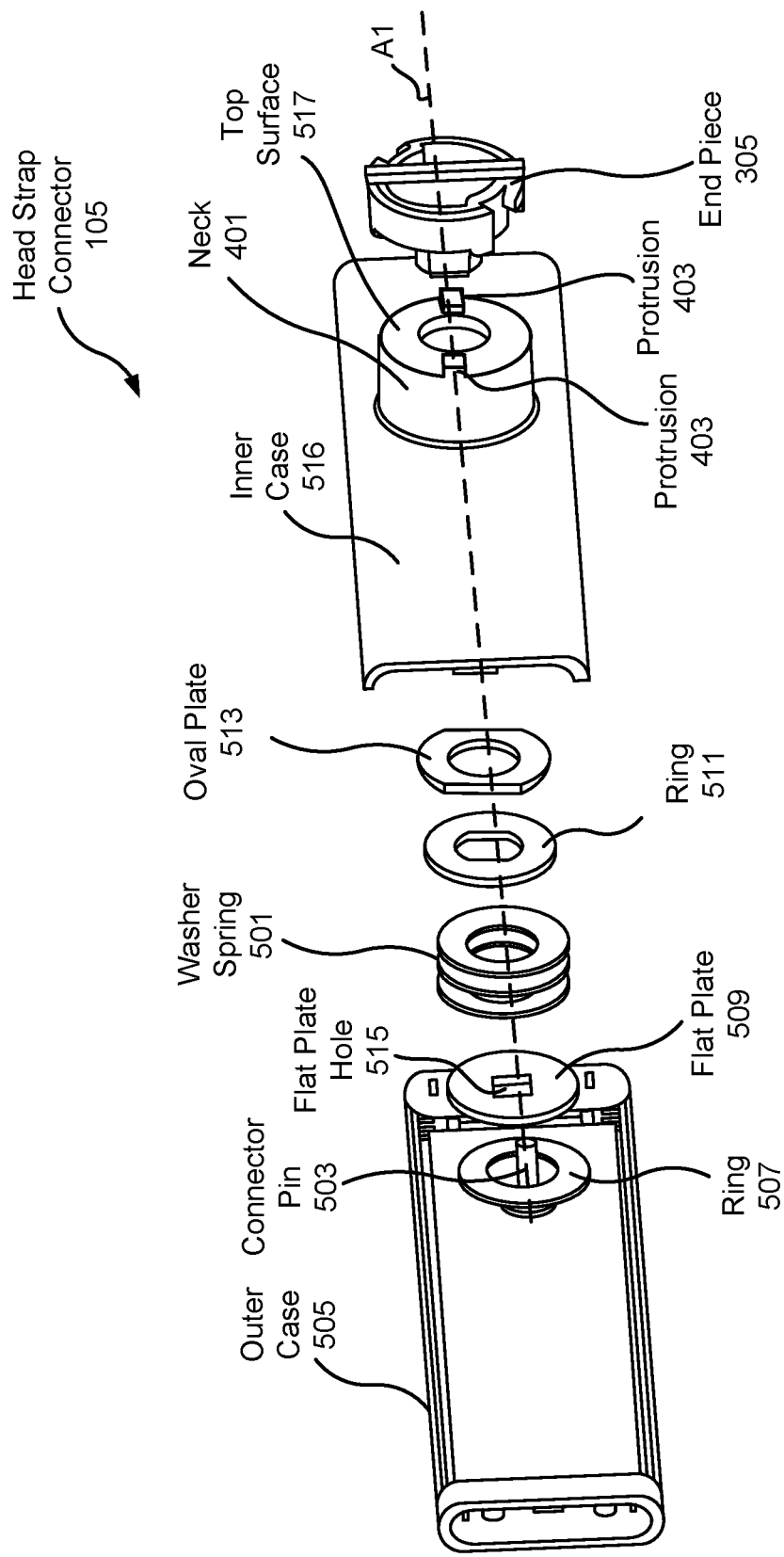
FIG. 5 is an exploded perspective view of the head strap connector and the end piece of the HMD of FIG. 4, according to one embodiment.

FIG. 5 is an exploded perspective view of the head strap connector 105 and the end piece 305 of the HMD 100 of FIG. 4, according to one embodiment. The head strap connector 105 may include, among other components, outer case 505, inner case 516, connector pin 503, ring 507, flat plate 509, washer spring 501, ring 511, and oval plate 513. The outer case 505 and inner case 516 are attached together. One end of the connector pin 503 is attached to the inside surface of the outer case 505 facing the inner case 516. The ring 507, flat plate 509, washer spring 501, ring 511, and oval plate 513 are held in alignment along axis A1 and pressed together by the connector pin 503. The connector pin 503 slides through the center holes of the ring 507, the flat plate 509, the washer spring 501, the ring 511, and the oval plate 513, and is attached to the end piece 305.

The outer case 505 and inner case 516 form interior area for housing the connector pin 503 and internal components (e.g., the ring 507, the flat plate 509, the washer spring 501, the ring 511, and the oval plate 513) of the head strap connector 105. The outer case 505 and inner case 516 attach together via interlocking ridges along the edge of each case. In another embodiment, the outer case 505 and inner case 516 are held together via adhesive or fasteners. The outer 505 and inner 516 cases may be made of any rigid material such as plastic or metal.

The connector pin 503 holds the head strap connector internal components in alignment along axis A1 and keeps them in contact with one another within the head strap connector 105. The connector pin 503 is received by the pin hole 607 (shown in FIG. 6) of the end piece 305 and fixed to the end piece 305. The connector pin 503 may also be rotatably connected to the inside of the outer case 505. The connector pin 503 is a cylindrical body orientated along axis A1 with a diameter (across a plane perpendicular to axis A1) smaller than the diameter (across the plane perpendicular to axis A1) of the central holes of the head strap connector internal components. This allows the connector pin 503 to clamp the internal components between one end of the connector pin 503 and the inside surface of the top surface 517, specifically loading the washer spring 501. The connector pin 503 may be a screw that screws into the end piece 305 or a rivet or pin that is captured axially by the end piece 305. The connector pin 503 may be made of rubber, plastic, or metal.

The ring 507 is placed between the internal surface of the outer case 505 and the flat plate 509 to enable the flat plate 509 to rotate relative to the outer case 505 in a smooth manner.

The flat plate 509 is formed with a flat plate hole 515 to receive a squared end of the end piece 305 and rotates with the end piece 305. Similar to the flat plate 509, the oval plate 513 receives a portion of the end piece 305. The oval plate 513 is fixed to the interior portion of the neck 401, and hence, the oval plate 513 rotates with the head strap connector.

The ring 511 is placed between the washer spring 501 and the oval plate 513. The ring 511 has a center hole that receives a portion of the end piece 305 in a manner so that the ring 511 rotates along with the end piece 305.

The washer spring 501 provides a force which creates frictional resistance against the end piece 305 rotating around axis A1 with respect to the inner case 516. The washer spring 501 is housed between the ring 511 and the flat plate 509. By applying a force that pushes the ring 511 and oval plate 513 against the inside surface of the top surface 517, a resistive friction force is created to prevent the end piece 305 (and other head strap connector internal components) from rotating unhindered. The washer spring 501 may be made of metal or plastic.

The top surface 517 of the neck 401 is the surface on which the end piece 305 rotates. It may be a separate component attached to the neck 401 or a part of the neck 401 itself. On the internal surface of the top surface 517, the oval plate 513 is pressed against the top surface 517 as a result of the force from the washer spring 501.

Figure 6:
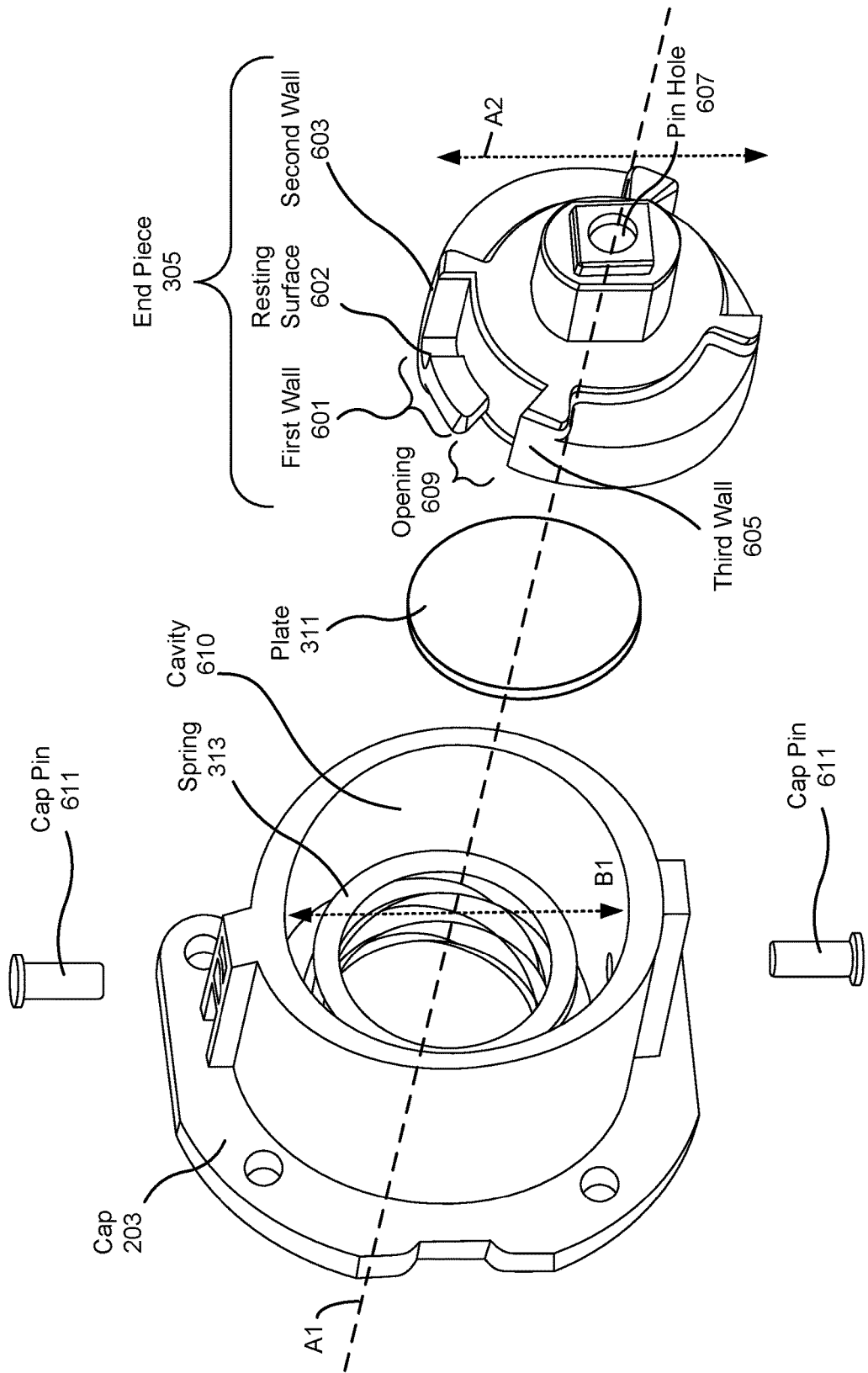
FIG. 6 is an exploded perspective view of a cap and the end piece of the HMD for illustrating a locking mechanism, according to one embodiment.
Figure 7:
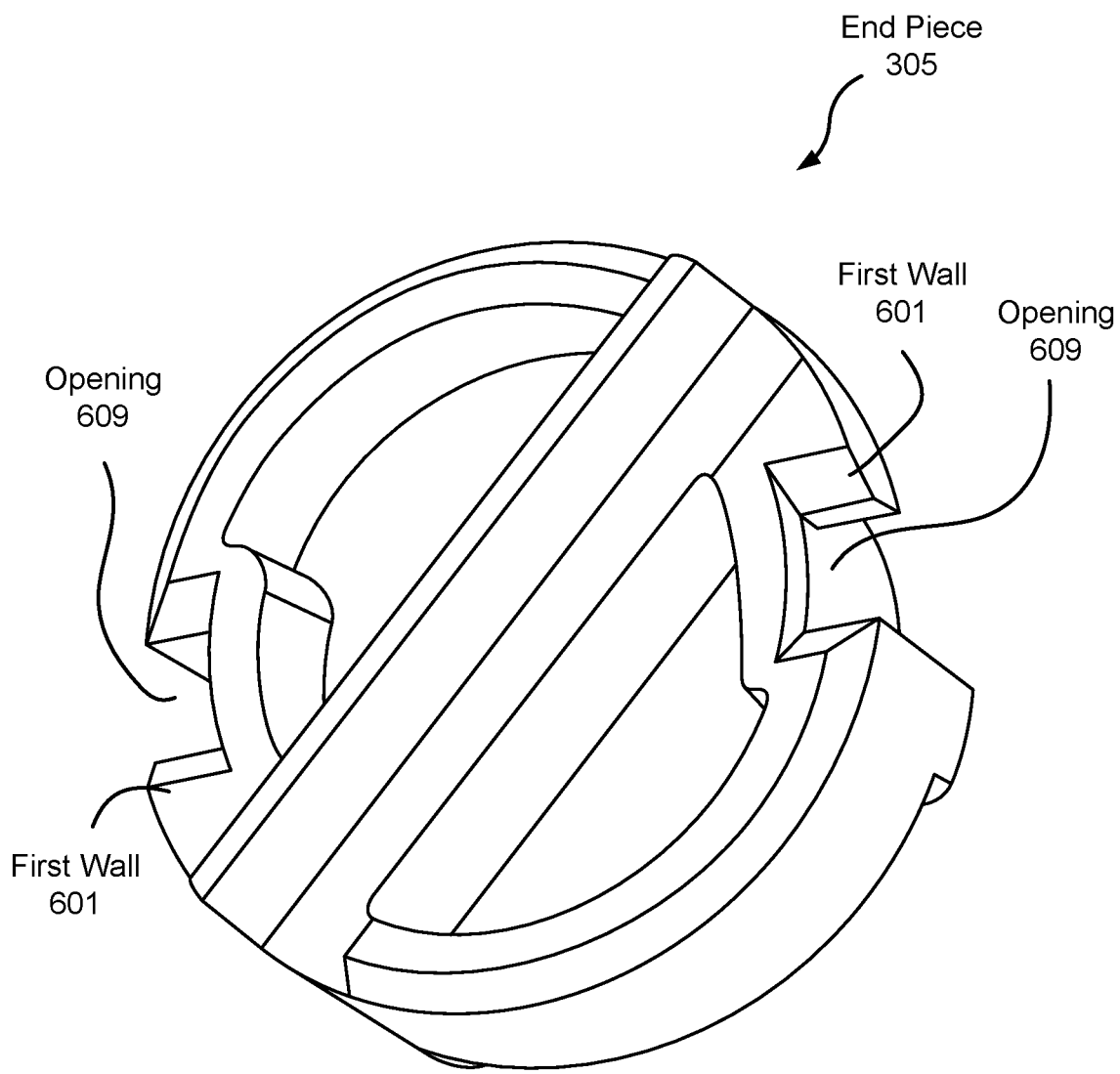
FIG. 7 is a perspective diagram of the end piece of the HMD, according to one embodiment.

FIG. 6 is an exploded perspective view of the cap 203 and the end piece 305 for illustrating a locking mechanism, according to one embodiment. FIG. 7 is a perspective diagram of the end piece 305 of the HMD 100, according to one embodiment. The locking mechanism enables the end piece 305 of the head strap connector 105 to be fixed to the cap 203 in a detachable manner. For this purpose, the end piece 305 has first wall 601, resting surface 602, second wall 603, third wall 605, and pin hole 607. An opening 609 is formed between the third wall 605 and the first wall 601.

Cap pins 611 are attached into the sides of the cap 203 so that the ends of the cap pins 611 protrude radially inward into the cavity 610. The first 601, second 603, and third 605 walls of the end piece 305 are attached to the outer surface of the end piece 305 facing towards the cap 203. The resting surface 602 is the side of the first wall 601 attached to the second wall 603, and the opening 609 is defined by the space between the first 601 and third 605 walls. The pin hole 607 is a hole in the end piece extending along the axis A1 and facing away from the HMD 100, towards the head strap connector 105 for receiving the connector pin 503 and allows the connector pin 503 to attach to the end piece 305.

The cavity 610 of the cap 203 houses the spring 313 and plate 311 and receives the end piece 305. In the embodiment of FIG. 6, the cavity 610 is cylindrical. The inner diameter B1 of the cavity 610 is larger than the diameter A2 of the end piece 305. By making the outer diameter A2 of the end piece 305 smaller than the inner diameter B1 of the cavity 610, the end piece 305 and connected head strap connector 105 may pivot about an axis perpendicular to axis A1, to a certain degree, forming an angle with axis A1. One of the advantages of enabling such pivoting is that the head strap assembly can accommodate the width of the users head.

The cap pins 611 engage with the end piece 305 when the end piece 305 is received by the cavity 610 and secure the end piece 305 to the cap 203. By inserting the end piece 305 into the cavity 610 so that a cap pin 611 slides along the opening 609, the cap pin 611 passes through the opening 609 defined by the first 601 and third 605 walls. Next, by rotating the end piece 305 around axis A1 relative to the cap 203, the cap pin 611 comes into contact with the second wall 603. The biasing force from the spring 313 then moves the end piece 305 outward (away from the HMD 100) along axis A1, such that the cap pin 611 comes in contact with the resting surface 602, defined by the connection of the first 601 and second 603 walls. In this way, the cap pin 611 and force from the spring 313 keep the end piece 305 interlocked with the cap pin 611 in the cavity 610 of the cap 203. Although only two cap pins 611 are displayed in FIG. 6, any number of cap pins 611 that the end piece 305 can accommodate may be used.

The end piece 305 may be removed from the cap 203 by countering the spring 313 biasing force (pushing along axis A1 towards the HMD 100) and rotating the end piece 305 along axis A1 in an opposite direction. These motions position the cap pin 611 so that it can pass through the opening 609 and allow the end piece 305 to slide out of the cavity 610 along axis A1, away from the HMD 100.

The first wall 601 prevents the end piece 305 from sliding out of the cavity 610 along axis A1, away from the HMD 100. The first wall 601 extends at least partially along a circumference (perpendicular to axis A1) of the end piece 305.

The second wall 603 is connected to the first wall 601 and extends along axis A1 to block further rotation (around axis A1) of the end piece 305 relative to the cap 203 by contacting the cap pin 611.

The resting surface 602 remains in contact with the cap pin 611 while the end piece 305 is interlocked with the cap 203. While interlocked, the cap pin 611 in contact with the resting surface 602 prevents the cap pin 611 from motion along or around axis A1, while simultaneously allowing limited rotation about axis A2. The resting surface 602 is defined by the connection of the first 601 and second 603 walls.

When inserting or removing the end piece 305 from the cavity 610 the third wall 605 blocks rotation (around axis A1) of the end piece 305 relative to the cap 203 by contacting the cap pin 611. The third wall 605 extends along axis A1, parallel to the second wall 603, to define the opening 609 between the first 601 and third 605 wall.

The opening 609, defined by the space between the first 601 and third 605 walls allows the cap pin 611 to be inserted into the end piece 305. The opening 609 must be wide enough to allow the cap pin 611 to pass through.

Although the embodiments described above was described primarily with respect to HMD, the strap hinge mechanism described herein may be employed in other devices such as goggles, and diagnostic tools for eye examination.

The invention claimed is:

1. A head-mounted display, comprising:
   an end piece rotatably connected to a head strap connector;
   a cap formed with a cavity extending in a longitudinal direction to receive the end piece, the cap secured to a frame of the head-mounted display; and at least one cap pin configured to protrude inward into the cavity of the cap to engage with the end piece for securing the end piece to the cap, the end piece rotatable relative to the cap after moving in the longitudinal direction to disengage the end piece from the cap for removal of the head strap connector from the cap.

2. The head-mounted display of claim 1, wherein the end piece comprises:
   a first wall extending at least partially along a circumference of the end piece,
   a second wall connected to the first wall and extending in the longitudinal direction to block further rotation of the end piece relative to the cap by contacting the at least one cap pin, and
   a third wall defining and an opening in conjunction with the first wall, the at least one cap pin inserted into the end piece through the opening.

3. The head-mounted display of claim 1, further comprising a spring in the cavity, the spring configured to apply a biasing force pushing the end piece away from the cap in the longitudinal direction.

4. The head-mounted display of claim 3, wherein the biasing force locks the end piece to the cap by placing the at least one cap pin on a resting surface of the end piece to prevent rotation of the end piece relative to the cap.

5. The head-mounted display of claim 3, further comprising a flat plate between the spring and the end piece.

6. The head-mounted display of claim 1, wherein the end piece has an outer dimension smaller than an inner dimension of the cavity to enable the end piece and the head strap connector to pivot relative to an axis forming an angle with an axis in the longitudinal direction.

7. The head-mounted display of claim 1, wherein the head strap connector comprises:
   an outer case facing away from the frame,
   an inner case facing towards the frame, the end piece attached to the inner case,
   a connector pin having one end attached to the outer case and another end rotatably received in a pin hole of the end piece,
   a flat plate having a flat plate hole to receive a portion of the end piece and rotating with the end piece, and
   a washer spring between the flat plate and the inner case to provide resistance against relative rotation between the inner case and the end piece.

8. The head-mounted display of claim 7, wherein the inner case comprises a neck protruding in the longitudinal direction towards the frame and having a top surface on which the end piece rotates.

9. The head-mounted display of claim 8, wherein the neck has at least one protrusion to restrict rotation of the end piece relative to the head strap connector.

10. The head-mounted display of claim 1, wherein the frame comprises an outer frame and an inner frame, the cap attached to the inner frame and the end piece is received through a frame hole in the outer frame.

11. The head-mounted display of claim 10, further comprising a speaker for producing sound between the outer frame and the inner frame.

12. A head strap connector comprising:
   an outer case;
   an inner case in conjunction with the outer case forming an interior area of the head strap connector;
   an end piece attached to the inner case in a rotatable manner, the end piece formed with a pin hole;
   a connector pin having one end attached to the outer case and another end rotatably received in the pin hole of the end piece;
   a flat plate having a flat plate hole to receive a portion of the end piece and rotating with the end piece; and
   a washer spring between the flat plate and the inner case to provide resistance against relative rotation between the inner case and the end piece to prevent the end piece from rotating unhindered.

13. The head strap connector of claim 12, wherein the end piece is inserted into a frame hole formed in a frame of a head-mounted display into a cavity of a cap extending in a longitudinal direction for locking onto the frame.

14. The head strap connector of claim 13, wherein the end piece comprises:
   a first wall extending at least partially along a circumference of the end piece,
   a second wall connected to the first wall and extending in the longitudinal direction to block further rotation of the end piece relative to the cap by contacting at least one cap pin extending into the cavity of the cap, and
   a third wall defining and an opening in conjunction with the first wall, the at least one cap pin inserted into the end piece through the opening.

15. The head strap connector of claim 13, wherein the end piece has an outer dimension smaller than an inner dimension of the cavity to enable the end piece and the head strap connector to pivot relative to an axis forming an angle with an axis in the longitudinal direction.

16. The head strap connector of claim 12, wherein the inner case comprises a neck protruding in a longitudinal direction towards a frame of a head-mounted display and having a top surface on which the end piece rotates.

17. The head strap connector of claim 16, wherein the neck has at least one protrusion to restrict rotation of the end piece relative to the head strap connector.

* * * * *